(12) United States Patent
van Rensburg

(10) Patent No.: US 10,785,450 B1
(45) Date of Patent: Sep. 22, 2020

(54) SYSTEM AND METHOD FOR INTELLIGENT CONFERENCE SESSION RECORDING

(71) Applicant: RingCentral, Inc., Belmont, CA (US)

(72) Inventor: Christopher van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/727,910

(22) Filed: Dec. 26, 2019

(51) Int. Cl.
*H04N 7/15* (2006.01)
*G06F 3/0482* (2013.01)
*H04L 29/06* (2006.01)

(52) U.S. Cl.
CPC ........... *H04N 7/155* (2013.01); *G06F 3/0482* (2013.01); *H04L 65/1069* (2013.01); *H04L 65/403* (2013.01)

(58) Field of Classification Search
CPC .......... H04N 7/15; H04L 29/06; G06F 3/0482
USPC ........................ 348/14.01–14.16; 379/202.01
See application file for complete search history.

(56) References Cited

U.S. PATENT DOCUMENTS

| | | | | |
|---|---|---|---|---|
| 7,590,230 B1* | 9/2009 | Surazski | ............... | H04M 3/561 379/158 |
| 2011/0271332 A1* | 11/2011 | Jones | .................... | H04L 9/3247 726/7 |
| 2011/0317825 A1* | 12/2011 | Baird | ...................... | H04M 3/40 379/202.01 |
| 2012/0063573 A1* | 3/2012 | Sylvain | ............. | H04M 3/42221 379/67.1 |
| 2014/0211928 A1* | 7/2014 | LeBlanc | ........... | H04M 3/42221 379/68 |
| 2015/0373063 A1* | 12/2015 | Vashishtha | .......... | H04L 65/1089 348/14.07 |
| 2017/0302718 A1* | 10/2017 | Ananthanarayanan | ...................... | H04L 12/1831 |

\* cited by examiner

*Primary Examiner* — Melur Ramakrishnaiah

(57) ABSTRACT

A computer-implemented method for intelligent conference recording is disclosed. The computer-implemented method for intelligent conference recording may analyze content and context information related to a conference session, determine if at least one recording threshold criteria is met, and based on the determined recording threshold criteria, start a recording of the conference session. The computer-implemented method for intelligent conference recording can share the conference session recording based on a voting result.

20 Claims, 8 Drawing Sheets

SYSTEM AND METHOD FOR INTELLIGENT CONFERENCE SESSION RECORDING

TECHNICAL FIELD

The present disclosure relates generally to the field of conference sessions. Specifically, the present disclosure relates to systems and methods for intelligent conference session recording.

BACKGROUND

In conventional video conference systems, participants have to manually start recordings of the conference session. This can be embarrassing for participants who are unfamiliar with the conference system, or who forget to start a recording of an important conference session when a moderator does not join on time.

With regards to recording access control, recordings are often stored in unknown storage locations that participants do not have access to. Additionally, if the conference session was recorded and stored in a storage drive with default global access, anybody can access the recording and watch, even if it contains confidential information for internal use by only particular people or groups of people inside an organization.

SUMMARY

The present disclosure addresses a real need to improve conference session recording systems and sharing processes of a recorded conference session. According to some embodiments, the conference session can be initiated between two or more participants. At least one recording threshold criteria can be determined by a conference management server related to the conference session, and based on reaching that at least one recording threshold criteria, the conference session recording can be automatically started by the conference management server.

In some embodiments, when at least one recording threshold criteria is met, participants can vote on sharing options for the recorded conference session. Based on voting results, the recorded conference session can be shared between different numbers of participants inside an organization.

In another embodiment, at least one participant can bookmark a time or time period during the video conference session. Voting for sharing the conference session recording can be made specifically for the bookmarked time or time period.

DETAILED DESCRIPTION

Figure 1:
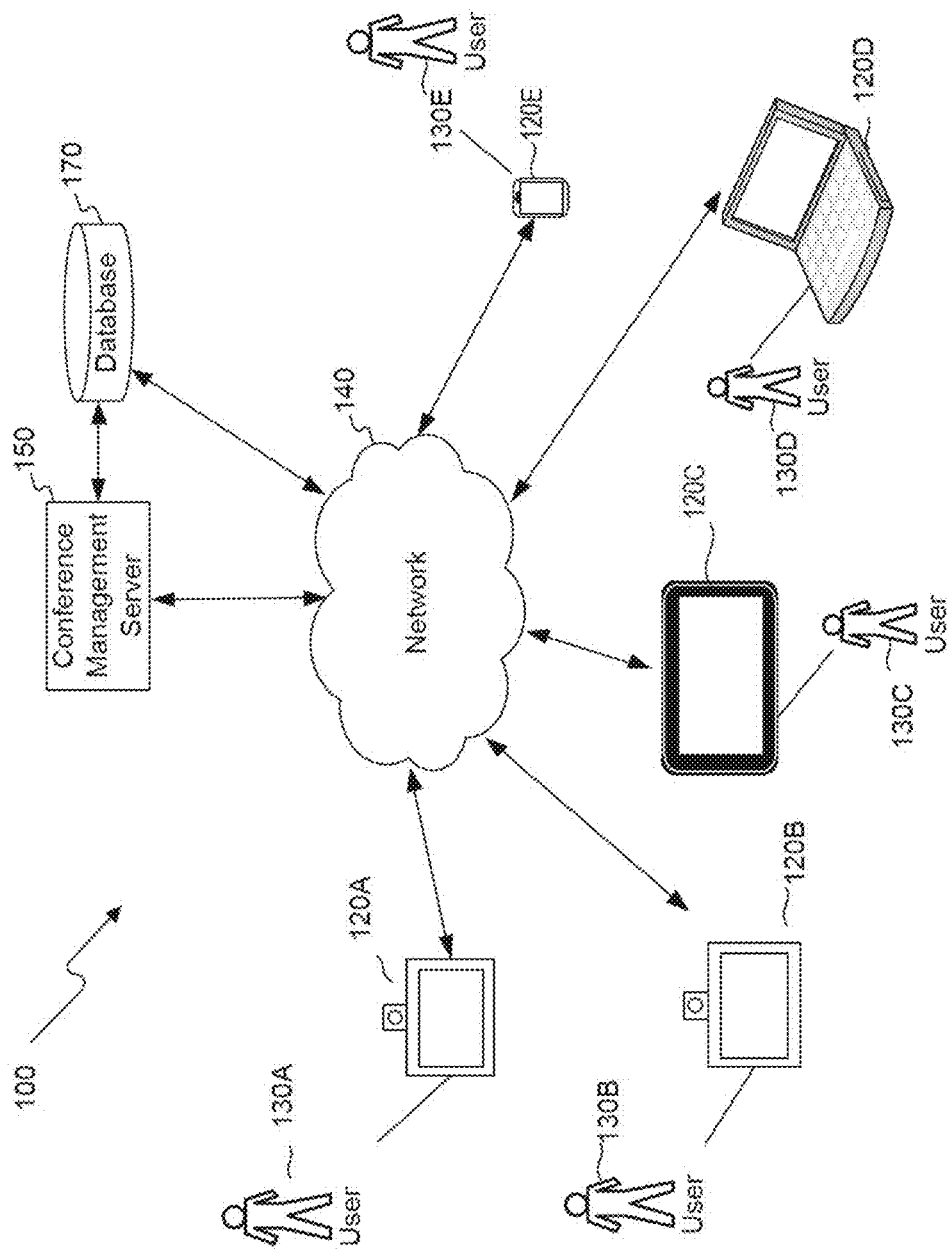
FIG. 1 depicts an example conference management system.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic)

quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

FIG. 1 shows an example of a conference management system 100 in which various implementations as described herein may be practiced. Conference management system 100 enables a plurality of users to schedule conferences, and receive notifications regarding such scheduled conferences. In some examples, one or more components of conference management system 100, such as conference management server 150, can be used to implement computer programs, applications, methods, processes, or other software to perform the described techniques and to realize the structures described herein.

As shown in FIG. 1, conference management system 100 includes one or more user devices 120A-120E (collectively, referred to as user devices 120), a network 140, a conference management server 150, and a database 170. The components and arrangements shown in FIG. 1 are not intended to limit the disclosed embodiments, as the system components used to implement the disclosed processes and features can vary.

The network 140 facilitates communications and sharing of conference scheduling content between user devices 120 (some or all) and the conference management server 150. The network 140 may be any type of networks that provides communications, exchanges information, and/or facilitates the exchange of information between the conference management server 150 and user devices 120. For example, network 140 broadly represents a one or more local area networks (LANs), wide area networks (WANs), metropolitan area networks (MANs), global interconnected internetworks, such as the public internet, public switched telephone networks ("PSTN"), or other suitable connection(s) or combination thereof that enables conference management system 100 to send and receive information between the components of conference management system 100. Each such network 140 uses or executes stored programs that implement networking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 140 and the disclosure presumes that all elements of FIG. 1 are communicatively coupled via network 140. A network may support a variety of electronic messaging formats, and may further support a variety of services and applications for user devices 120.

The conference management server 150 can be a computer-based system including computer system components, desktop computers, workstations, tablets, hand-held computing devices, memory devices, and/or internal network(s) connecting the components. The conference management server 150 may be configured to provide conference services, such as setting up conference sessions for users 130A-130E. The conference management server 150 may be configured to receive information from user devices 120 over the network 140, process the information, store the information to a database 170, and/or transmit notifications to the user devices 120 over the network 140. For example, the conference management server 150 may be configured to analyze physical inputs, video signals, and audio signals sent by users 130A-130E, and analyze the received content and context information related to the conference session for generating corresponding notifications to the users.

In an embodiment, the conference management server 150 may send notifications to user devices 120A-120E, based on, for example, meeting at least one recording threshold criteria. The notifications may include information regarding the at least one recording threshold criteria that has been met, information about conference session recording status, information about a need to vote for sharing the recording of the conference session, and/or information about voting results for sharing the recording of the conference, as further described herein.

In some implementations, the functionality of the conference management server 150 described in the present disclosure is distributed among one or more of the user devices 120A-120E. For example, one or more of the user devices 120A-120E may perform functions such as determining the at least one recording threshold criteria, and providing related information to the conference management server, or the other user devices.

The database 170 includes one or more physical or virtual storages coupled with the conference management server 150. The database 170 is configured to store the recording of the conference session, voting results related to the recording of the conference session. In some embodiments, the database 170 is stored in a cloud-based server (not shown) that is accessible by the conference management server 150 and/or the user devices 120 through the network 140. While the database 170 is illustrated as an external device connected to the conference management server 150, the database 170 may also reside within the conference management server 150 as an internal component of the conference management server 150.

As shown in FIG. 1, users 130A-130E may communicate with conference management server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E may include mobile devices such as a tablet or a smartphone having display and video/audio capture capabilities. User devices 120A-120E may also include one or more software applications that facilitate the user devices to engage in communications, such as IM, text messages, EMAIL, VoIP, video conferences, with one another.

Figure 2:
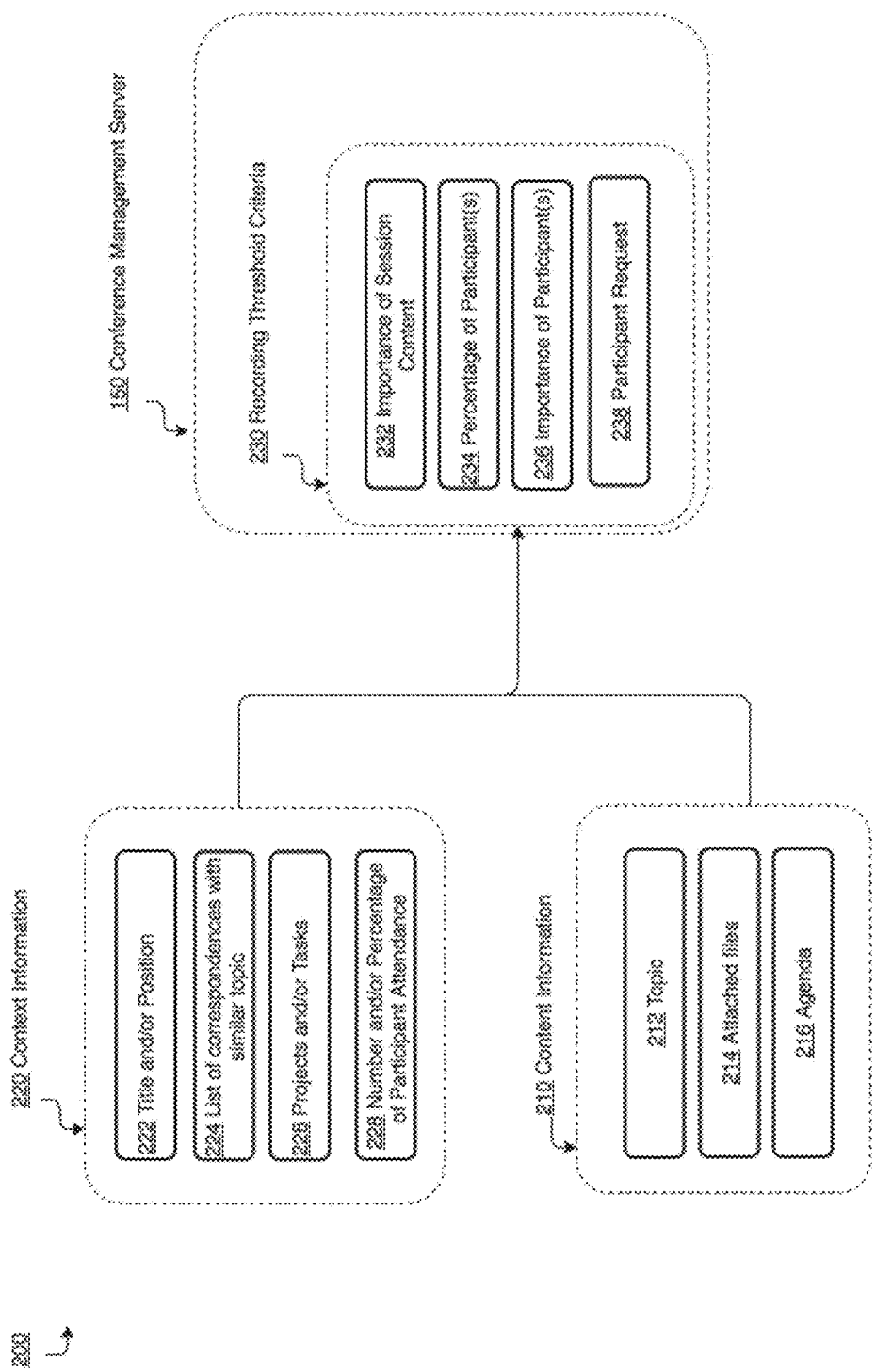
FIG. 2 depicts an example of obtaining context and content information for a conference session.

FIG. 2 shows an example of a user interface (UI) 200 where at least one recording threshold criteria has been met. The UI 200 can be displayed, for example, on a user device 120A. The example UI 200, where at least one recording threshold criteria has been met, shows a conference session initiated between users 130A-130D. The conference session may be related, for example, to planning an upcoming software release, which is mentioned as a topic for the conference session in an invitation to the conference session. As shown in the example UI 200, users 130A-130D are active participants of the conference session. Users 130A-130D may be representatives of different departments of an organization, such as development, operations, and so forth, with no managerial titles. User 130E, who has a title of release manager and is in charge of the upcoming release, was invited to the conference session but was not able to attend.

A recording threshold is a threshold at which a recording will be initiated. In order to determine whether this threshold for initiating a recording has been met, the conference management server 150 analyzes the presence or absence of a variety of different recording threshold criteria. If one or more of these recording threshold criteria are present and have been determined to have been met, then the recording threshold has been met and the conference management server 150 automatically initiates a recording, as further described herein. The presence of one or more recording threshold criteria may be determined based on context information, content information, or any other information. Example types of recording threshold criteria include: an importance of session content, a number or percentage of participants not in attendance, an importance of participant(s) not in attendance, and an explicit request from one or more participants in attendance or one or more participants not able to attend, as further described herein.

For example, the conference management server 150 can analyze context information related to the users 130A-130E. In an embodiment, context information can include titles of the users 130A-130E, positions in the organization of the users 130A-130E, projects that the users 130A-130E are involved in, technical skills of users 130A-130E, the number or percentage of users 130A-130E who have accepted or rejected invitations, the number or percentage of users 130A-130E who are in attendance or not in attendance, and so forth. In another embodiment, the conference management server 150 can analyze content information related specifically to the conference session. Such content information may include, for example, the topic of the conference session, files that have been attached to the invitation to the conference session, an agenda of the conference session, or any other content information related to the conference session. The conference management server 150 obtains context and content information about the conference from user devices 120A-120E, from the invitation to the conference session, from one or more database(s) 170 and/or any other data sources (not shown) where context and/or content information related to users 130A-130E or the conference session is stored.

In the example of FIG. 2, the conference management server 150 receives a conference session invitation to determine content information 210 and context information 220 associated with the invitation to the conference session. The conference management server 150 can parse the conference session invitation to obtain content information 210 related to the conference session. The conference management server 150, using existing email parsing software and text recognition techniques, can determine a topic 212 of the conference session, files 214 that are attached to the invitation to the conference session, and agenda 216 of the conference session. Optical character recognition (OCR) techniques can be used to determine content of the files 214 that are attached to the invitation to the conference session, agenda 216, and topic 212 of the conference session. The conference management server 150 determines context information of the conference session by any of the following steps. For example, the conference management server 150 determines recipients of the conference session invitation and sends a request to a mail server (not shown) of an organization to obtain titles and/or positions 222 of the Users 130A-130E in the organization. In another embodiment, the conference management server 150 can send a search request to the mail server of the organization for a list of correspondences (such as emails) with similar topics 224 to the topic of the conference session that was recognized in the content determination step. In different embodiments, the conference management server 150 sends a request to a task management service of the organization to obtain a list of tasks 226 related to the topic of the conference session and the users assigned the tasks from the list. In another embodiment, the conference management server 150 sends a request to a task tracking system to obtain a list of projects and/or tasks 226 that are assigned to the Users 130A-130E or that they participate in. In another embodiment, the conference management server 150 receives answers from the Users 130A-130E about their acceptance of the invitation to the conference session and has information about the number and/or percentage of participant attendance 228. The conference management server 150 determines, based on the obtained content information 210 and context information 220, if at least one of recording threshold criteria 230 is met and recording of the conference session is needed. In one embodiment, conference management server 150 can determine if importance of session content 232 recording threshold criteria 230 is met based on topic 212, conference agenda 216, and list of correspondences with similar topic 224. In another embodiment, the conference management server 150 can determine if percentage of participant(s) 234 recording threshold criteria 230 is met based on number and/or percentage of participant attendance 228. In another embodiment, the conference management server 150 can determine if importance of participant(s) 236 recording threshold criteria 230 is met based on topic 212, attached files 214, title and/or position 222, and projects and/or tasks 226. In another embodiment, the conference management server 150 can determine that participant request 238 recording threshold criteria 230 is met and start a recording of the conference session.

Figure 3:
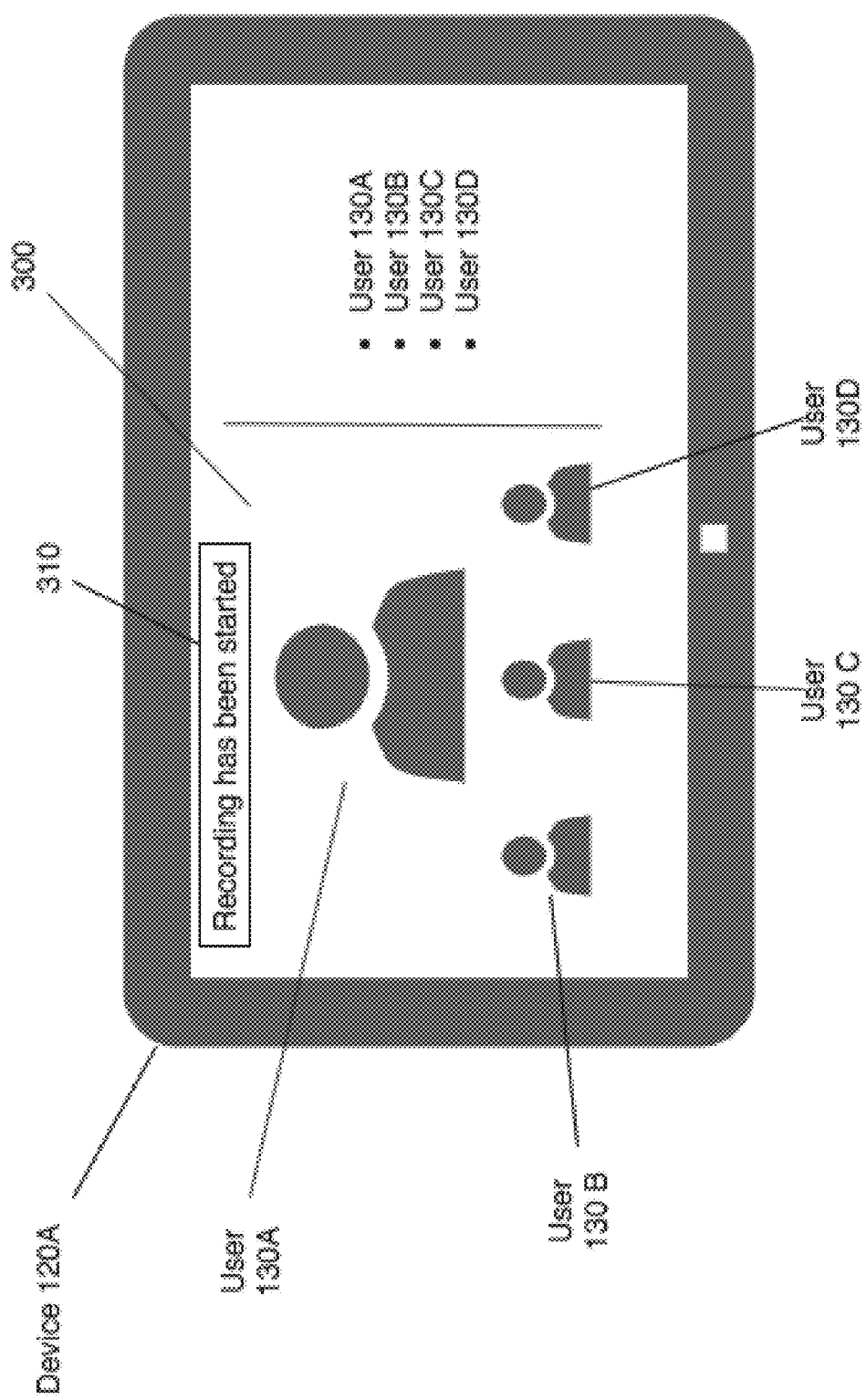
FIG. 3 depicts an example of a user interface where at least one recording threshold criteria is met.

In the example of FIG. 3, the context information 220 of the conference session includes that five users were invited to the conference session, four users are currently attending, and one user is not attending. All attending users 130A-130D are not managers, and the one user 130E who is not in attendance is not only a manager, but is also in charge of the topic of the conference session. Content information 210 of the conference session includes the topic of the conference session, which relates to a key business process in the organization. In this example embodiment, no attachments or agendas were provided with the invitation. Based on an analysis of the context and/or content information, the conference management server 150 can determine that at least one recording threshold criteria is met and send a notification 310 that is displayed in the UI 300.

In the example above, two recording threshold criteria are met: 1) importance of the conference session content to the organization and 2) importance of a participant according to the title of the user 130E who is not in attendance. While this particular example features two recording threshold criteria, the number and type of recording threshold criteria should not be construed as limiting. Any number and any type of recording threshold criteria may be used to initiate a recording. Each of the recording threshold criteria can be taken into consideration by the conference management server 150, either alone or together.

Example recording threshold criteria may include: the importance of the conference session content, the number of participants who are not in attendance, the importance of the participants who are not in attendance, an explicit request from a participant, or any other criteria, the presence of which triggers a recording.

The importance of the content of the conference session can be based on a single factor or multiple factors. In some embodiments, the importance of the content can be determined based on the topic of a conference session (e.g.—if the topic relates to: a key business processes and/or to a key project, a major client of the organization, an issue that affects a major part of the organization, etc.). In other embodiments, the importance of the content is determined based on an attachment to an invitation to the conference session (e.g.—an attachment that contains: confidential information, information related to an important topic described above, etc.). In other embodiments, the importance of the content is determined based on the agenda of the conference session (e.g.—if the agenda contains confidential information, information related to the important topic described above, etc.). These parameters can be taken into consideration by the conference management server 150 to determine the importance of the conference session as a whole or as single parameter.

In another embodiment, a particular number of participants who are not in attendance can be taken as a recording threshold criteria. For instance, in the event that an invitation to the conference session is sent to ten users, but only four of the invited users attend the conference session, then six users are not in attendance, which represents 60% (a majority) of all invited users not attending. The conference management server 150 can determine that a recording of the conference session is needed based on the number of invited users who are not in attendance. The number of invited users not in attendance can be set as a percentage of the total number of users invited to the conference session. For example, the percentage can be set such that the recording starts if more than 40%, 50%, 60% or any other percentage of invited users are not attending the conference session. Determination of a number of participants who are attending and a number of participants who are not attending can be made by the conference management server 150 based on a number of connections (both voice connection via PSTN or cellular network or the Internet and video connections) to the conference management server 150. Every connection has an initiator identifier, such as a phone number, user ID, and so forth, that identify a participant of the conference session. Additionally, facial recognition and/or voice recognition techniques can be used to determine attending participants when several of them are using shared audio or video devices (e.g.—a video conference room and/or a conference phone).

In another embodiment, the conference management server 150 can start recording when important participants are unable to attend or are not currently attending a conference session. The importance of the participant can be determined by the conference management server 150 based on his/her position in the organization, title, experience in the topic of the conference session, or any other factor. As described in the example above, user 130E, who has a title of "release manager," not only has a managerial position, but would also have extensive knowledge and experience pertaining to the conference session topic of "upcoming release planning." Consequently, user 130E would be considered by the conference management server 150 as an important participant, and based at least on the presence of this recording threshold criteria, that is, the inability of important participant user 130E to attend the conference, the recording would be started. In an embodiment, the important participant recording threshold criteria can be set for a predefined level for participants. The predefined level may be, for example, a particular type of title or level within the organization (e.g. C-suite, manager level, etc.). If at least one invited participant with the predefined level inside the organization is unable to attend or is not currently attending the conference session, then the recording of the conference session will be started.

In another embodiment, the important participant recording threshold criteria can be determined based on an experience level of a user related to the topic of the conference session. Experience level can be determined to be "high," "medium," or "low" based on, for example, a length of time working in the industry, a length of time working at a particular organization, a length of time holding a particular job title, or any other factor that indicates a level of experience. In an example embodiment, the recording of the conference session can be started based on one or more non-attending participants with a "medium" or higher level of experience. In the example described above, the user 130E who has the title of "release manager," has a "high" level of experience in the conference session topic of "upcoming release planning" and should be considered an important participant.

In another embodiment, a level of involvement in the topic of the conference session should be taken into account by the conference management server 150 when determining if a participant is important enough to meet the recording threshold criteria and initiate the recording of the conference session. Level of involvement in the topic can be determined based on particular tasks that a user executes in the organization and how they relate to the topic of the conference session. Level of involvement can be determined to be "low," "medium," or "high," for example. In the example above, if most of the tasks assigned to user 130E relate to the topic "upcoming release planning," the level of involvement for user 130E should be set as "high". In an embodiment, determining a user's level of involvement can be based on his internal communications by email, chat, or phone. In another embodiment, determining a user's level of involvement can be based on records in a Customer Relationship Management (CRM) system in the organization, or based on tickets within issue tracking systems, or based on commits within source code control systems.

When the conference management server 150 makes a context status determination for one or more participants to determine whether the recording threshold criteria is met, the context statuses of users can be stored in the database 170 along with the recording of the conference session. For example, if the conference management server 150 determines that user 130E in the example above is an important participant based on his or her title, then the "important participant" status is stored in database 170 for future use.

Figure 4:
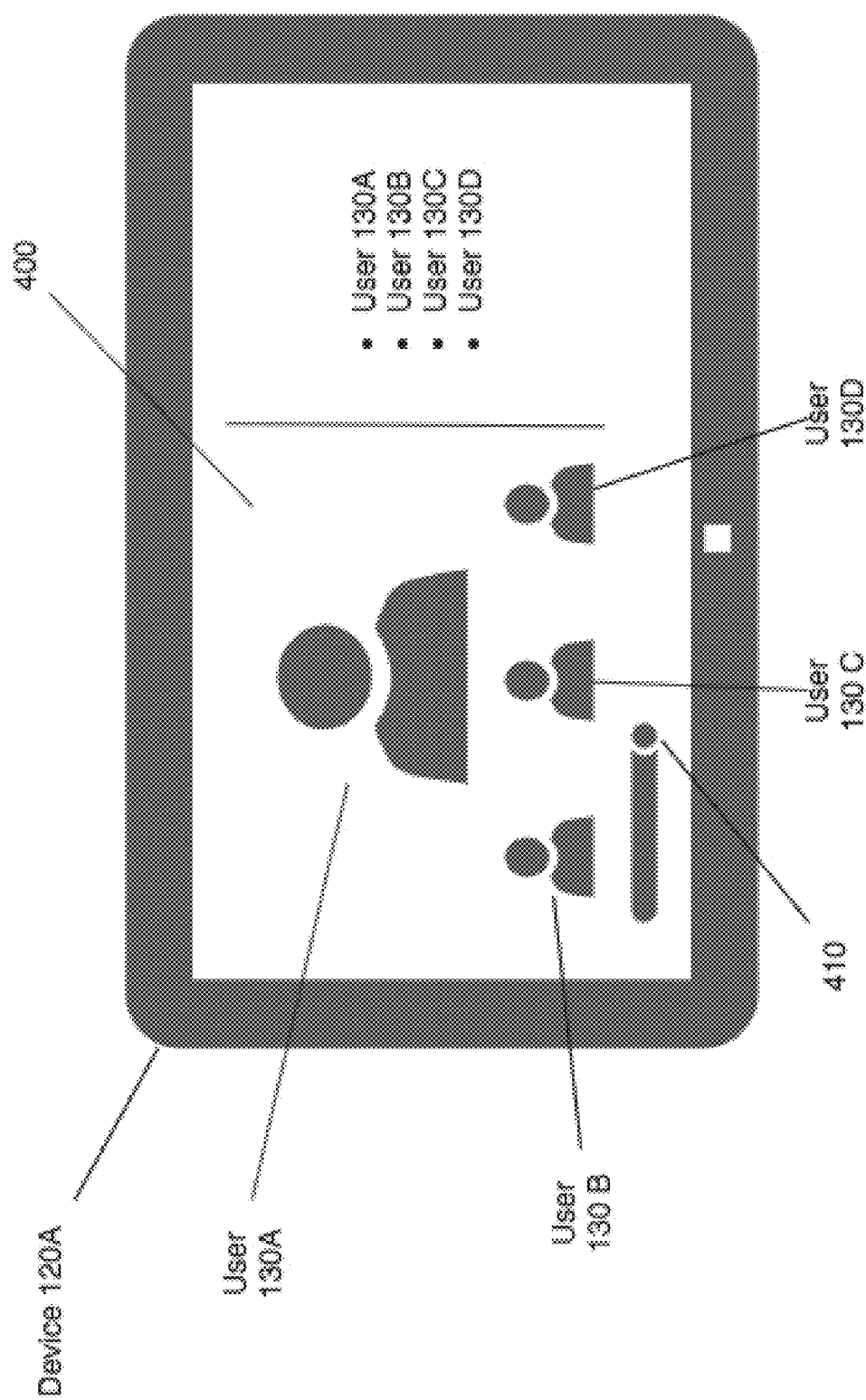
FIG. 4 depicts an example of a user interface with a bookmark option.

FIG. 4 shows an example of a UI 400 with a bookmark option. The UI 400 with a bookmark option can be displayed, for example, on the user device 120A. The example of the UI 400 with a bookmark option shows a conference session initiated between users 130A-130D and related, for example, to an upcoming release planning mentioned as a topic for the conference session in an invitation to the conference session. As shown in the example of the UI 400 with a bookmark option, users 130A-130D are active participants of the conference session. Users 130A-130D may be representatives of different departments of an organization, such as development, operations and so forth, who do not hold managerial positions. In the example embodiment of FIG. 4, user 130E, who is a release manager of an upcoming release, was invited to the conference session but was not able to attend. In one embodiment, when conference management server 150 determines that a recording of a conference session should be started and starts the recording of the conference session, a time bar 410 can be displayed in the UI 400 with a bookmark option. The time bar 410 shows the total elapsed time of the conference session. Users 130A-130D can point, using any type of pointing devices (e.g. mouse, keyboard, finger in case of a touch screen, and so forth) at a time point on the time bar 410 and bookmark a time moment or a time period (e.g. the time point on the time bar 410 minus 5 minutes). The bookmarked time point or time period can be stored by the conference management server 150 in the database 170 along with the recorded conference session. The bookmarked time period from the time point on the time bar 410 minus 5 minutes means that a time period starting from five minutes ago until the pointed-to time point is bookmarked. Time period can be chosen by the users 130A-130B by moving the pointer along the time bar 410, or several options for time period can be displayed on the UI 300 in the pointed time point and can contain different time periods (e.g. −5 minutes, −10 minutes, etc.).

Figure 5:
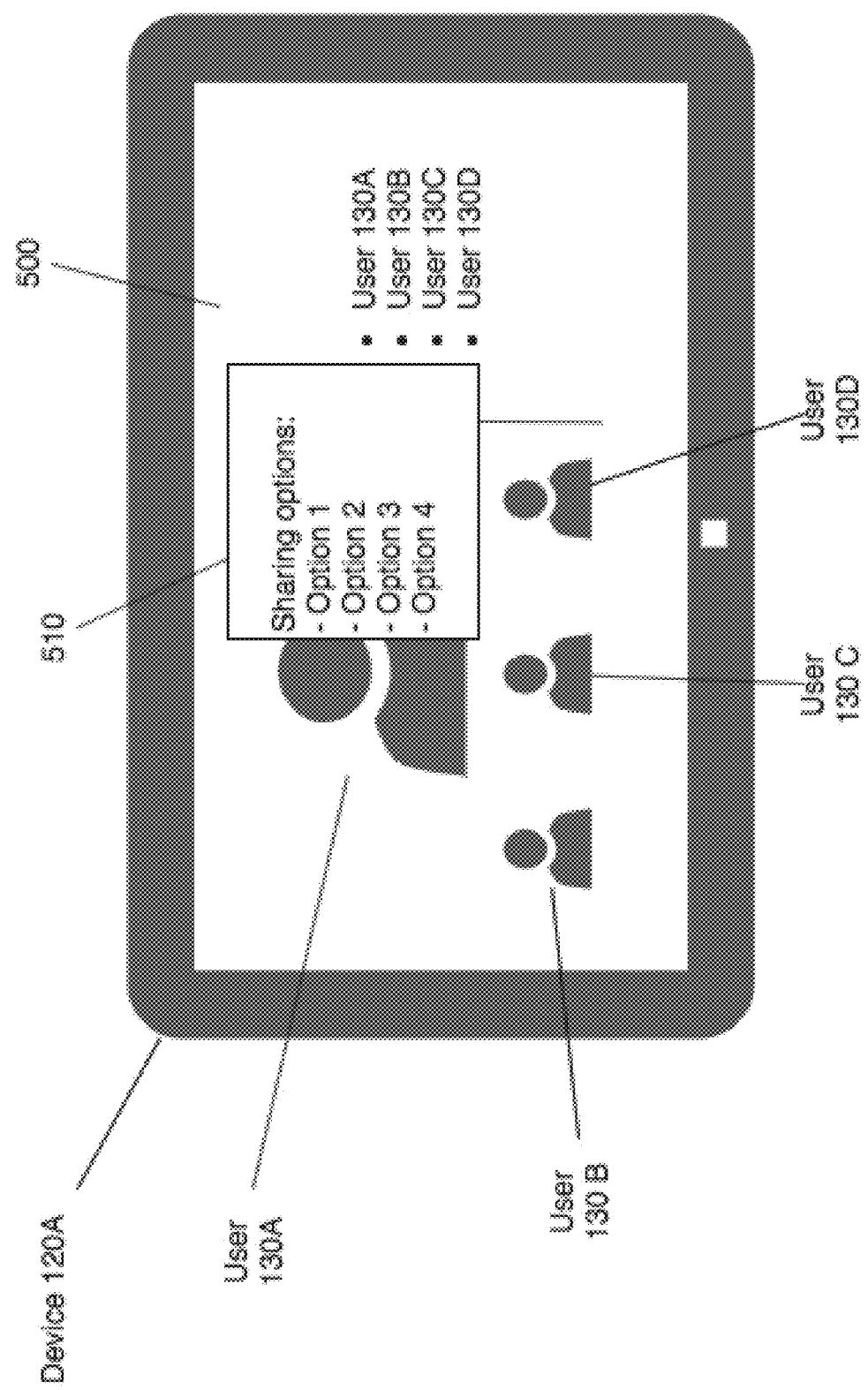
FIG. 5 depicts an example of a user interface with voting options.

FIG. 5 shows an example of a UI 500 with sharing options. The UI 500 with sharing options can be displayed, for example, on the user device 120A. The example of the UI 500 with sharing options shows a conference session initiated between users 130A-130D and related, for example, to an upcoming release planning mentioned as a topic for the conference session in an invitation to the conference session. As shown in the example UI 500 with sharing options of FIG. 5, users 130A-130D are active participants of the conference session. Users 130A-130D may be representatives of different departments of an organization, such as development, operations, and so forth, who do not hold managerial positions. User 130E, who is a release manager of an upcoming release, was invited to the conference session but was not able to attend.

In some embodiments, a recording of the conference session can be stored in the database 170. An access to the recording of the conference session can be granted based on the results of a vote taken among the attendees, invitees, or any particular group of users associated with the conference session. After the conference session ends, a menu featuring sharing options 510 can be displayed in the UI 500. In the example of FIG. 5, sharing options 510 comprise sharing Option 1, Option 2, Option 3, and Option 4. In some embodiments, the options may correspond to the following: Option 1—do not share; Option 2—share with invited participants; Option 3—share with all users in an organization; Option 4—share bookmarked time period with all users in the organization. The foregoing should not be construed as limiting, as sharing options 510 can comprise of fewer sharing options or more sharing options. Different types of options besides the options listed above may also be provided. In some embodiments, sharing options 510 can be suggested by the users 130A-130D or can be suggested by the conference management server 150. Users 130A-130D may vote by clicking on a sharing option using input devices (e.g. mouse, finger in case of touch screen, and so forth) or by verbally conveying the user's selected sharing option. Voting results can be calculated by the conference management server 150 based on the total number of votes for each option, whereby the voting decision is defined by the option with the most votes. In the event that two or more options receive an identical number of votes, the conference management server 150 determines which option received the most votes from most experienced users, from users with highest position in an organization, and/or from the most involved users, and set such option as the voting decision. Based on the voting decision, the conference management server 150 assigns an attribute describing the voting decision to the recording of the conference session stored in the database 170 and stores the attribute in the database 170. In the example of FIG. 5, the conference management server 150, based on voting decisions, can assign the following attributes to the recording of the conference session: "do not share" if Option 1 received the most votes, "share with invited participants" if Option 2 received most the votes, "share with everyone in an organization" if Option 3 received the most votes, and "share bookmarked time period with all users in the organization" if Option 4 received the most votes. Voting decisions can be executed by the conference management server 150. For example, in the event that an option that involves sharing was decided on, the conference management server 150 will send a link to the recording of the conference session using email, chat message, or any other communication channel, to all users in the organization or to users invited to the conference session. In the event that a "no sharing" option was decided on, the conference management server 150 will not send the recording to anyone.

Figure 6:
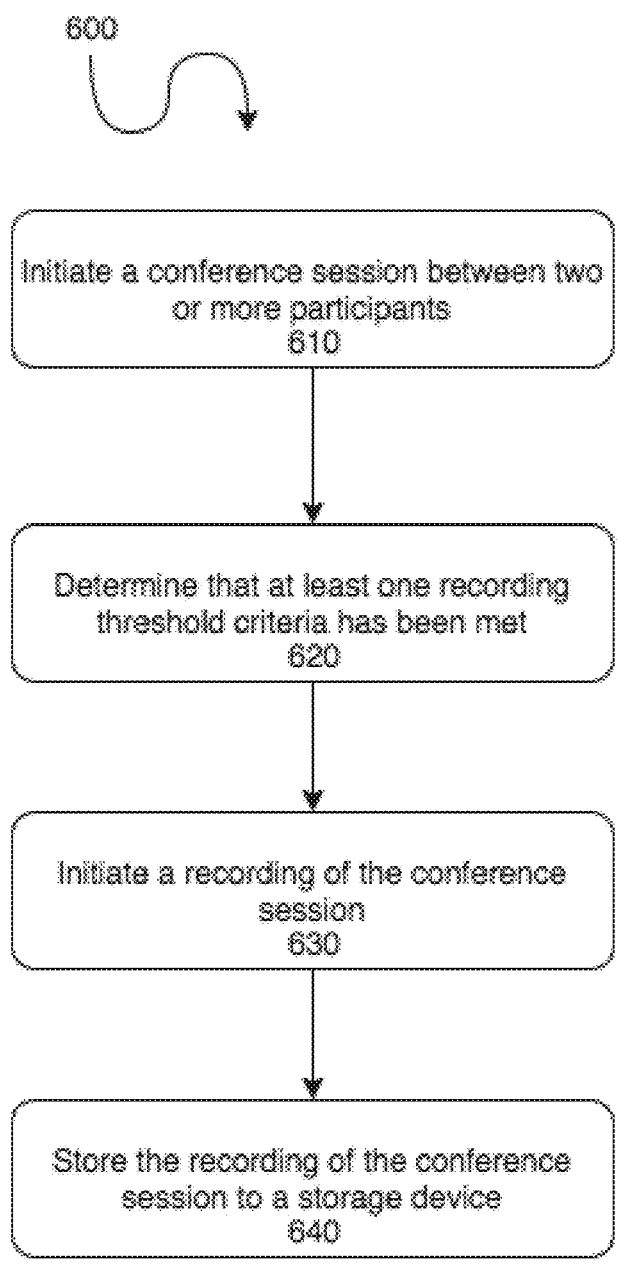
FIG. 6 is a flow chart that shows a process for recording a conference session.

FIG. 6 shows a flow chart 600 for recording a conference session in accordance with embodiments of the present disclosure. The steps associated with this example process may be performed by, for example, a processor of the conference management server 150 of FIG. 6.

At step 610, the conference session between two or more participants can be initiated. In some embodiments, the conference session can be a video conference, an audio conference, a webinar, or a presentation. In another embodiment, the conference session can be initiated through network 140. An invitation to the conference session may be sent by devices 120A-120E, for example. The two or more participants may be any two users of devices 130A-130D, for example.

At step 620, it is determined that at least one recording threshold criteria is met. In some embodiments, a recording threshold criteria can be determined by the conference server 150 based on a request from a participant who is unable to attend. For example, a user 130E that cannot attend the conference session may reply to an invitation to the conference session by email with a request for the recording of the conference session. The request can be written in a body of a reply email and can be parsed by the conferences management server 150. Conference management server 150, based on the request for the recording of the conference session from the user 150, determines that the recording threshold criteria is met and starts the recording of the conference session.

In some embodiments, the conference management server 150 can send notifications to the users 130A-130D that a particular recording threshold criteria was met and/or that the recording was started. In some embodiments, the notification about the recording can be displayed in the UI 300 of FIG. 3.

In some embodiments, the conference management server 150 can determine that a recording of the conference session is needed based on a number of participants who are not in attendance. The number of participants who are not in attendance can be set as a percent of all invited users to the conference session. For example, the recording may be configured to automatically start if more than 50%, 40%, 60%, or any other percentage of invited users are not attending the conference session.

In another embodiment, the conference management server 150 can determine that the recording is needed based on an importance of the content of the conference session. Importance of the content of the conference session can be determined based on a topic of a conference session, based on an attachment to an invitation to the conference session (e.g.—an attachment that contains: confidential information, information related to an important topic described above, etc.). In other embodiments, the importance of the content is determined based on the agenda of the conference session (e.g.—if the agenda contains confidential information, information related to the important topic described above, etc.).

The topic of the conference session can be determined by the conference management server as being "important content of the conference" when it relates to key business processes and/or to a key project, to a major client of the organization, to an issue that affects a major part of the organization, etc. These parameters can be taken into consideration by the conference management server 150 to determine the importance of the conference session as a whole or as single parameter.

In another embodiment, the conference management server 150 can start recording when an important participant cannot attend or is not attending the conference session. The importance of the participant can be based on his/her position in an organization, title, experience in the topic of the conference session, or any other factor, as previously discussed herein.

Referring to FIG. 1, the user 130E has a managerial title of "release manager" that is strongly related to the topic, has high experience in the conference session topic "upcoming release planning," and should be considered by the conference management server 150 to be an important participant. Based at least on the foregoing recording threshold criteria, that is, the inability of important participant user 130E to attend the conference, the recording should be started. The important participant threshold criteria can be set for a predefined level in the organization of the participant (e.g.—manager level). When at least one participant with such predefined level inside the organization cannot or is not attending the conference session, the recording of the conference session should be started. The level in the organization can be set by an initiator of the conference session or can be set automatically by the conference management server 150 based on the level of other participants. For example, when initiating a conference session between executives of the organization with Vice President level and higher, the important participant recording threshold criteria can be set for a level of Senior Vice President. In another embodiment, the important participant recording threshold criteria can be calculated as one level up from most of the conference session participants. For example, when ten users are invited to the conference session and seven of them are engineers (i.e.—70% of the participants) and three are team leaders (i.e.—30% of participants), the important participant recording threshold criteria should be set for the "team leader" position because most of the participants are engineers.

In another embodiment, the important participant recording threshold criteria can be determined based on an experience level of a user related to the topic of the conference session. Experience level can be determined to be "high", "medium" or "low". The recording of the conference session can be started based on participant(s) who are not in attendance and who have a "medium" or higher level of experience. As described above in the example of FIG. 1, the user 130E who is the release manager has a "high" level of experience in the topic "upcoming release planning" of the conference session and should be considered an important participant. In other embodiments, other grades of experience level can be applied. For example, numerical grades from 1 to 10 may be used, where 1 indicates a low experience level in the topic of the conference session and 10 indicates a high experience level in the topic of the conference session. Experience level for the participants can be set by other participants or can be set by the conference management server 150 based on context data stored in the database 170.

In another embodiment, a level of involvement in the topic of the conference session should be taken into account by the conference management server 150 when determining if the recording of the conference session is needed. The level of involvement in the topic can be based on particular tasks that a user executes in the organization and how they relate to the topic of the conference session. The level of involvement can be determined to be "low", "medium" or "high". In the example above in FIG. 1, the majority of the tasks assigned to user 130E relate to the topic "upcoming release planning" because of his position in the organization, so his level of involvement should be set as "high". Determining a user's level of involvement can be based on his internal communications by email, chat, phone, or based on records in a Customer Relationship Management (CRM) system in the organization, or based on tickets in issue tracking systems, or based on commits within source code control systems. In other embodiments, other grades of the level of involvement in the topic of the conference session can be applied. For example, numerical grades from 1 to 10 may be used, where 1 indicates a low level of involvement in the topic of the conference session and 10 indicates a high level of involvement in the topic of the conference session. The level of involvement of the participant can be set by other participants or can be set by the conference management server 150 based on context data stored in the database 170.

At step 630, the conference management server 150, based on the determination at step 520, may initiate a recording of the conference session. In some embodiments the conference server 150 can record the conference session. In other embodiments, the conference management server can instruct at least one user device, for example at least one device of the user devices 120A-120D from FIG. 1, to record the conference session.

At step 640, the conference management server 150 stores the recording of the conference session in the database 170. In another embodiment, the conference management server 150 can store content and context information about the conference session in the database 170 along with the recording of the conference session. In other embodiments, the conference management server can instruct at least one user device, for example at least one device of the user devices 120A-120D from the FIG. 1, to record the conference session and/or store content and context information about the conference session in the database 170 along with the recording of the conference session.

Figure 7:
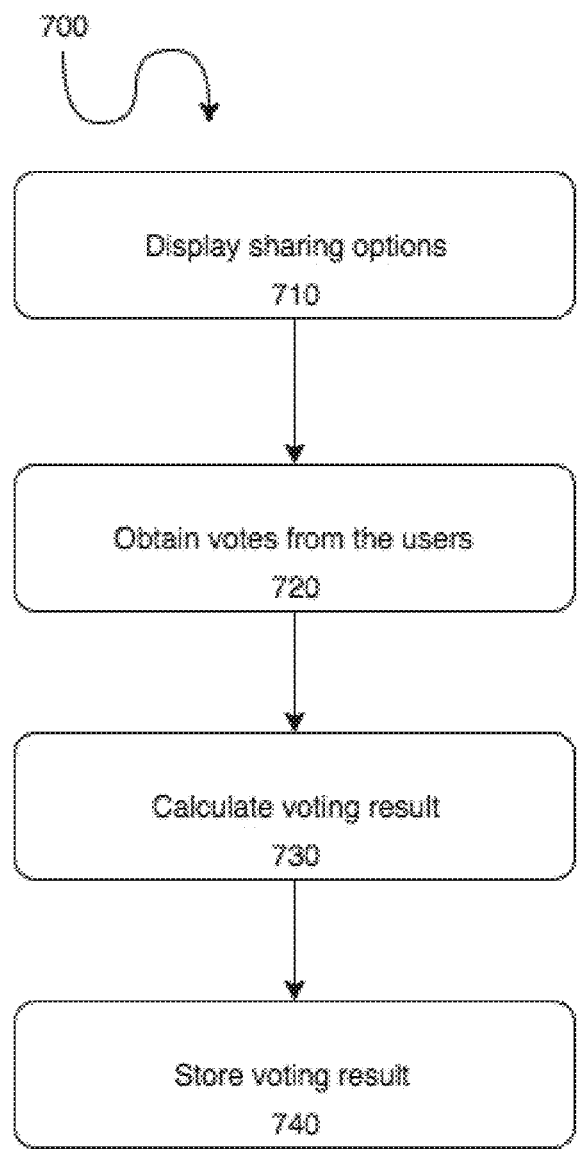
FIG. 7 is a flow chart that shows a process for voting.

FIG. 7 shows a flow chart 700 for voting. Voting can be initiated by the conference management server 150.

At step 710, sharing options can be displayed in the UI 300 as shown in FIG. 3. Sharing options can be suggested by the users 130A-130D through the devices 120A-120D or can be suggested by the conference management server 150.

At step 720, the conference management server 150 can obtain votes from the users 130A-130D. The users 130A-130D can vote using input devices associated with devices 120A-120D. For example, users 130A-130D can use keyboard, mouse pointer, trackball or a finger in case of touch screen on the devices 120A-120D. In another embodiment the users 130A-130D can vote by verbally announcing their sharing option. The conference management server 150 obtains verbally announced votes through audio input devices of the devices 120A-120D, transcribes them using speech-to-text algorithms, and parses the transcribed text to determine the users' choices.

At step 730, the conference management server 150 calculates voting results by counting and totaling the number of votes for each option. The option that has the most votes defines the voting decision. In case two or more options receive an identical number of votes, the conference management server 150 determines which option received votes from the most experienced users, from users with highest position in an organization, and/or from the most involved users, and sets such option as the voting decision.

In another embodiment, the conference management server 150 can assign a modifier to each vote from each participant based on a participant's title, position in an organization, involvement in a topic of a conference session, and/or experience in a topic of a conference session. In some embodiments, the modifier can add one or more votes to the vote of a particular participant. For example, if the participant has a managerial position, the conference management server counts his vote as: 1 for his base vote plus 1 for his position modifier, for a total of 2 votes for one participant. Additionally, if the same participant has been determined to also have a "high" level of involvement in the topic of the conference session, the conference management server counts his vote as: 1 for his base vote, plus 1 for his position modifier, plus 1 for his involvement modifier, for a total of 3 votes for that participant. In another embodiment, the modifier can multiply a participant's vote by twice, three times, or any other multiplier. For example, if the participant has a managerial position, the conference management server counts his vote as: 1 for his base vote multiplied by 2 for his position modifier, for a total of 2 votes for that participant. Additionally, if the same participant has been determined to also have a "high" level of involvement in the topic, the conference management server counts his vote as: 1 for his base vote multiplied by 2 for his position modifier and further multiplied by 2 for his involvement modifier, for a total of 4 votes for that participant.

At step 740, the conference management server 150 assigns an attribute describing the voting decision to the recording of the conference session, which is stored in the database 170, and stores the attribute in the database 170. Referring to FIG. 5, the conference management server 150, based on the voting decision, can assign the following example attributes to the recording of the conference session: "do not share" if Option 1 received the most votes, "share with invited participants" if Option 2 received the most votes, "share with everyone in an organization" if Option 3 received the most votes, or "share bookmarked time period with all users in the organization" if Option 4 received the most votes. Voting decisions can be sent by the conference management server 150 with a link to the recording of the conference session using email, chat message or another communication channel to all users in the organization, to users invited to the conference session, or to no one. The above options should not be considered as limiting as the conference management server 150 behavior depends on the voting options and the voting results.

Figure 8:
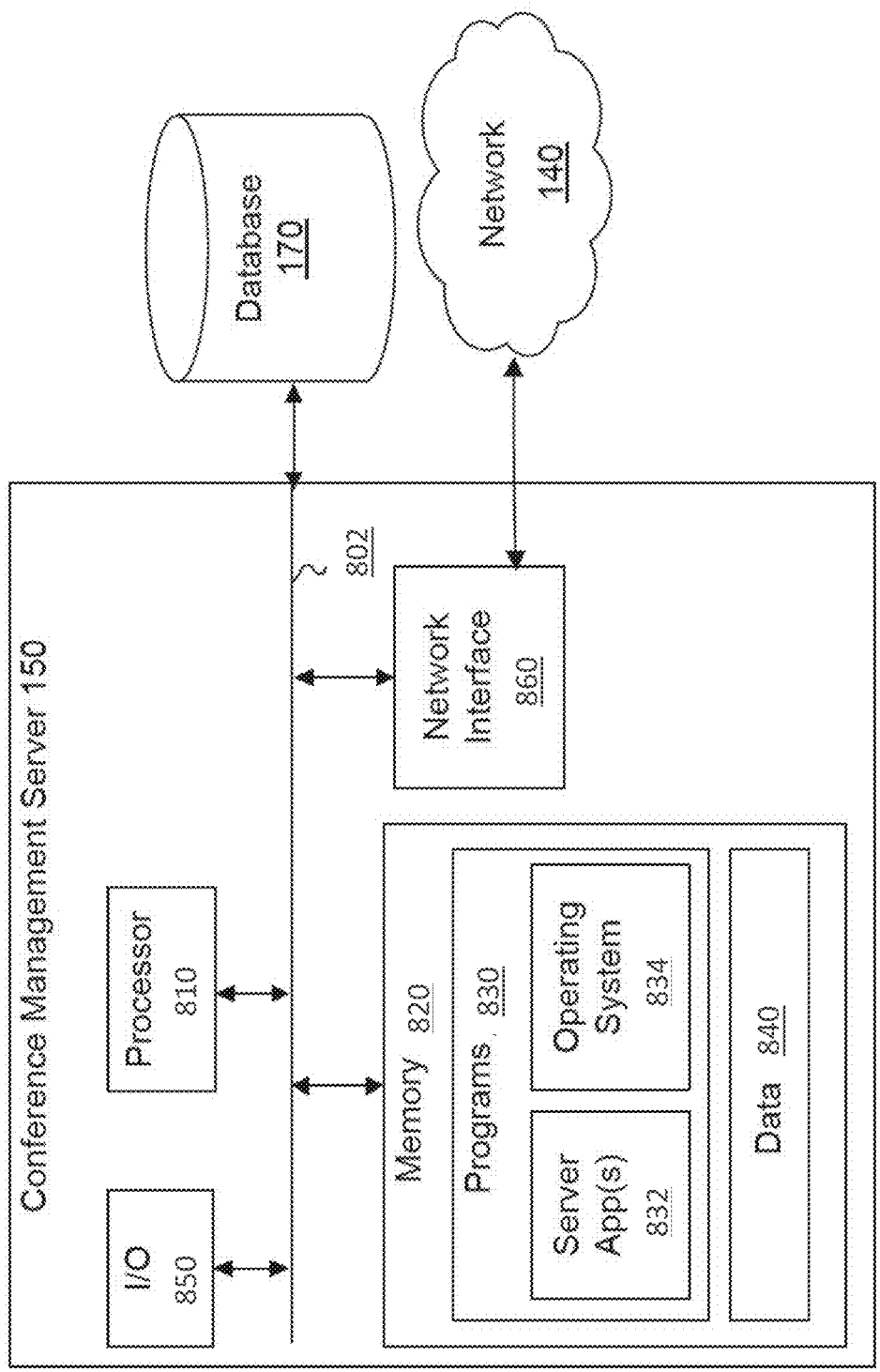
FIG. 8 depicts an example of a conference management server.

FIG. 8 shows a diagram of an example conference management server 150, consistent with the disclosed embodiments. The conference management server 150 includes a bus 802 (or other communication mechanism) which interconnects subsystems and components for transferring information within the conference management server 150. As shown, the conference management server 150 may include one or more processors 810, input/output ("I/O") devices 850, network interface 860 (e.g., a modem, Ethernet card, or any other interface configured to exchange data with a network), and one or more memories 820 storing programs 830 including, for example, server app(s) 832, operating system 834, and data 840, and can communicate with an external database 170 (which, for some embodiments, may be included within the conference management server 150). The conference management server 150 may be a single server or may be configured as a distributed computer system including multiple servers, server farms, clouds, or computers that interoperate to perform one or more of the processes and functionalities associated with the disclosed embodiments.

The processor 810 may be one or more processing devices configured to perform functions of the disclosed methods, such as a microprocessor manufactured by Intel™ or manufactured by AIVID™. The processor 810 may comprise a single core or multiple core processors executing parallel processes simultaneously. For example, the processor 810 may be a single core processor configured with virtual processing technologies. In certain embodiments, the processor 810 may use logical processors to simultaneously execute and control multiple processes. The processor 810 may implement virtual machine technologies, or other technologies to provide the ability to execute, control, run, manipulate, store, etc. multiple software processes, applications, programs, etc. In some embodiments, the processor 810 may include a multiple-core processor arrangement (e.g., dual, quad core, etc.) configured to provide parallel processing functionalities to allow the conference management server 150 to execute multiple processes simultaneously. It is appreciated that other types of processor arrangements could be implemented that provide for the capabilities disclosed herein.

The memory 820 may be a volatile or non-volatile, magnetic, semiconductor, tape, optical, removable, non-removable, or other type of storage device or tangible or non-transitory computer-readable medium that stores one or more program(s) 830 such as server apps 832 and operating system 834, and data 840. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The conference management server 150 may include one or more storage devices configured to store information used by processor 710 (or other components) to perform certain functions related to the disclosed embodiments. For example, the conference management server 150 includes memory 820 that includes instructions to enable the processor 810 to execute one or more applications, such as server apps 832, operating system 834, and any other type of application or software known to be available on computer systems. Alternatively or additionally, the instructions, application programs, etc. are stored in an external database 170 (which can also be internal to the conference management server 150) or external storage communicatively coupled with the conference management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 820 and database 170 may include one or more memory devices that store data and instructions used to perform one or more features of the disclosed embodiments. The memory 820 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the conference management server 150 may be communicatively connected to one or more remote memory devices (e.g., remote databases (not shown)) through network 140 or a different network. The remote memory devices can be configured to store information that the conference management server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 830 include one or more software modules causing processor 810 to perform one or more functions of the disclosed embodiments. Moreover, the processor 810 may execute one or more programs located remotely from one or more components of the communications system 100. For example, the conference management server 150 may access one or more remote programs that, when executed, perform functions related to disclosed embodiments.

In the presently described embodiment, server app(s) 832 causes the processor 810 to perform one or more functions of the disclosed methods. For example, the server app(s) 832 may cause the processor 810 to analyze content and context of a conference session to determine if at least one recording threshold criteria is met. In some embodiments, other components of the communications system 100 may be configured to perform one or more functions of the disclosed methods. For example, user devices 120A-120E may be configured to host a conference and determine if at least one record threshold criteria is met. As another example, user devices 120A-120E may be configured to provide a user interface for a participant to bookmark time or time period during a conference session. As another example, user devices 120A-120E may be configured to provide a user interface for a participant to view voting options for the recording of the conference session and vote for any of displayed options.

In some embodiments, the program(s) 830 may include the operating system 834 performing operating system functions when executed by one or more processors such as the processor 810. By way of example, the operating system 834 may include Microsoft Windows™ Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 834. The conference management server 150 may also include software that, when executed by a processor, provides communications with network 140 through the network interface 860 and/or a direct connection to one or more user devices 120A-120E.

In some embodiments, the data 840 includes, for example, a data associated with a conference session participant such as their title, their position inside an organization, their experience in a topic of the conference, their involvement in the topic of the conference.

The conference management server 150 may also include one or more I/O devices 750 having one or more interfaces for receiving signals or input from devices and providing signals or output to one or more devices that allow data to be received and/or transmitted by the conference management server 150. For example, the conference management server 150 may include interface components for interfacing with one or more input devices, such as one or more keyboards, mouse devices, and the like, that enable the conference management server 150 to receive input from an operator or administrator (not shown).

What is claimed is:

1. A computer-implemented method for improving initiation of conference session recordings, the method comprising:
    initiating a conferencing session between two or more participants;
    determining that at least one recording threshold criteria has been met for the conferencing session, wherein the at least one recording threshold criteria is independent of a participant;
    in response to determining that the at least one recording threshold criteria has been met, initiating a recording of the conferencing session; and
    storing the recording of the conferencing session in a storage device.

2. The method of claim 1, wherein the at least one recording threshold criteria is a number of participants who are not in attendance.

3. The method of claim 1, wherein the at least one recording threshold criteria comprises at least one of: an importance of content of the conferencing session or unavailability of important participants.

4. The method of claim 3, wherein the importance of the participant is based on a position of the participant inside an organization, experience of the participant in a topic of the conferencing session, or a level of involvement of the participant in a topic of the conferencing session.

5. The method of claim 1, further comprising:
    sharing the stored recording based on a vote from the two or more participants of the conferencing session.

6. The method of claim 5, wherein the vote is made during the conferencing session or after the conferencing session.

7. The method of claim 5, wherein the vote is made verbally by the two or more participants or by participant input using a conferencing user interface (UI).

8. The method of claim 1, further comprising:
    displaying in the conference UI, associated with one or more participants a bookmarking option, wherein the bookmarking option enables the at least one participant of the conference session to bookmark a time or a time period.

9. The method of claim 5, wherein the bookmarked time or time period of claim 8 can be shared based on a vote from the two or more participants of the conferencing session.

10. The method of claim 1, wherein access control to the recording is based on voting results from the two or more participants.

11. The method of claim 5, wherein the recording is shared with participants in attendance, with participants in attendance and with participants not in attendance, or with all users of an organization.

12. A system for improving initiation of conference session recordings, the system comprising:
    a memory; and
    at least one processor operatively connected to the memory and configured to:
    initiate a conferencing session between two or more participants;
    determine that at least one recording threshold criteria has been met for the conferencing session, wherein the at least one recording threshold criteria is independent of a participant;
    in response to determining that the at least one recording threshold criteria has been met, initiate a recording of the conferencing session; and
    store the recording of the conferencing session in a storage device.

13. The system of claim 12, wherein the at least one recording threshold criteria is a number of participants who are not in attendance.

14. The system of claim 12, wherein the at least one recording threshold criteria comprises at least one of: an importance of content of the conferencing session or unavailability of important participants.

15. The system of claim 14, wherein the importance of the participant is based on a position of the participant inside an organization, experience of the participant in a topic of the conferencing session, or a level of involvement of the participant in a topic of the conferencing session.

16. The system of claim 12, further comprising:
    sharing the stored recording based on a vote from the two or more participants of the conferencing session.

17. The system of claim 16, wherein the vote is made verbally by the two or more participants or by participant input using a conferencing user interface (UI).

18. The system of claim 12, further comprising:
    displaying in the conference UI, associated with one or more participants a bookmarking option, wherein the bookmarking option enables the at least one participant of the conference session to bookmark a time or a time period.

19. The system of claim 16, wherein the bookmarked time or time period of claim 18 can be shared based on a vote from the two or more participants of the conferencing session.

20. The system of claim 12, wherein access control to the recording is based on voting results from the two or more participants.

* * * * *